United States Patent
Mantri et al.

(10) Patent No.: US 9,483,290 B1
(45) Date of Patent: Nov. 1, 2016

(54) METHOD AND SYSTEM FOR VIRTUAL MACHINE COMMUNICATION

(71) Applicant: QLOGIC, Corporation, Aliso Viejo, CA (US)

(72) Inventors: Neeraj Mantri, Udaipur (IN); Tanmay Pradip Shete, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 291 days.

(21) Appl. No.: 14/264,927

(22) Filed: Apr. 29, 2014

(51) Int. Cl.
  *G06F 9/455* (2006.01)
  *H04L 29/08* (2006.01)

(52) U.S. Cl.
  CPC ....... *G06F 9/45533* (2013.01); *H04L 67/1097* (2013.01)

(58) Field of Classification Search
  None
  See application file for complete search history.

(56) References Cited

U.S. PATENT DOCUMENTS

| | | | | |
|---|---|---|---|---|
| 7,502,884 B1* | 3/2009 | Shah | ........... | H04L 67/1097 370/395.21 |
| 2005/0114855 A1* | 5/2005 | Baumberger | ....... | G06F 9/45558 718/1 |
| 2005/0120160 A1* | 6/2005 | Plouffe | ........... | G06F 9/45537 711/1 |
| 2006/0233168 A1* | 10/2006 | Lewites | ........... | H04L 12/462 370/389 |
| 2009/0276775 A1* | 11/2009 | Brown | ........... | G06F 9/5077 718/100 |
| 2011/0103389 A1* | 5/2011 | Kidambi | ........... | H04L 45/586 370/395.1 |
| 2011/0154318 A1* | 6/2011 | Oshins | ........... | G06F 9/45537 718/1 |
| 2012/0005671 A1* | 1/2012 | Baratakke | ........... | G06F 9/45541 718/1 |
| 2012/0324442 A1* | 12/2012 | Barde | ........... | H04L 49/70 718/1 |

* cited by examiner

*Primary Examiner* — Shih-Wei Kraft
(74) *Attorney, Agent, or Firm* — Klein, O'Neill & Singh, LLP

(57) ABSTRACT

Methods and systems for a virtual environment are provided. A method includes receiving a packet from a first virtual machine at a virtual switch; determining if the packet is destined to a second virtual machine by comparing a destination address to a mapping data structure maintained by the virtual switch; transferring the packet to a first virtual function of a device assigned to the first virtual machine by directly mapping the first virtual function to the first virtual machine; the first virtual function initiating a direct memory access (DMA) operation to transfer the packet to the second virtual machine based on a logical memory address of the second virtual machine that is received from a second virtual function; and using the DMA operation to transfer the packet to the second virtual machine.

20 Claims, 4 Drawing Sheets

METHOD AND SYSTEM FOR VIRTUAL MACHINE COMMUNICATION

TECHNICAL FIELD

The present disclosure relates to a virtual machine environment and more particularly to virtual machine communication.

BACKGROUND

Virtual machines are commonly used today. Virtual machines share physical resources, including adapters, storage and other devices. Virtual machines may communicate with each other and continuous efforts are being made to improve such communication.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1:
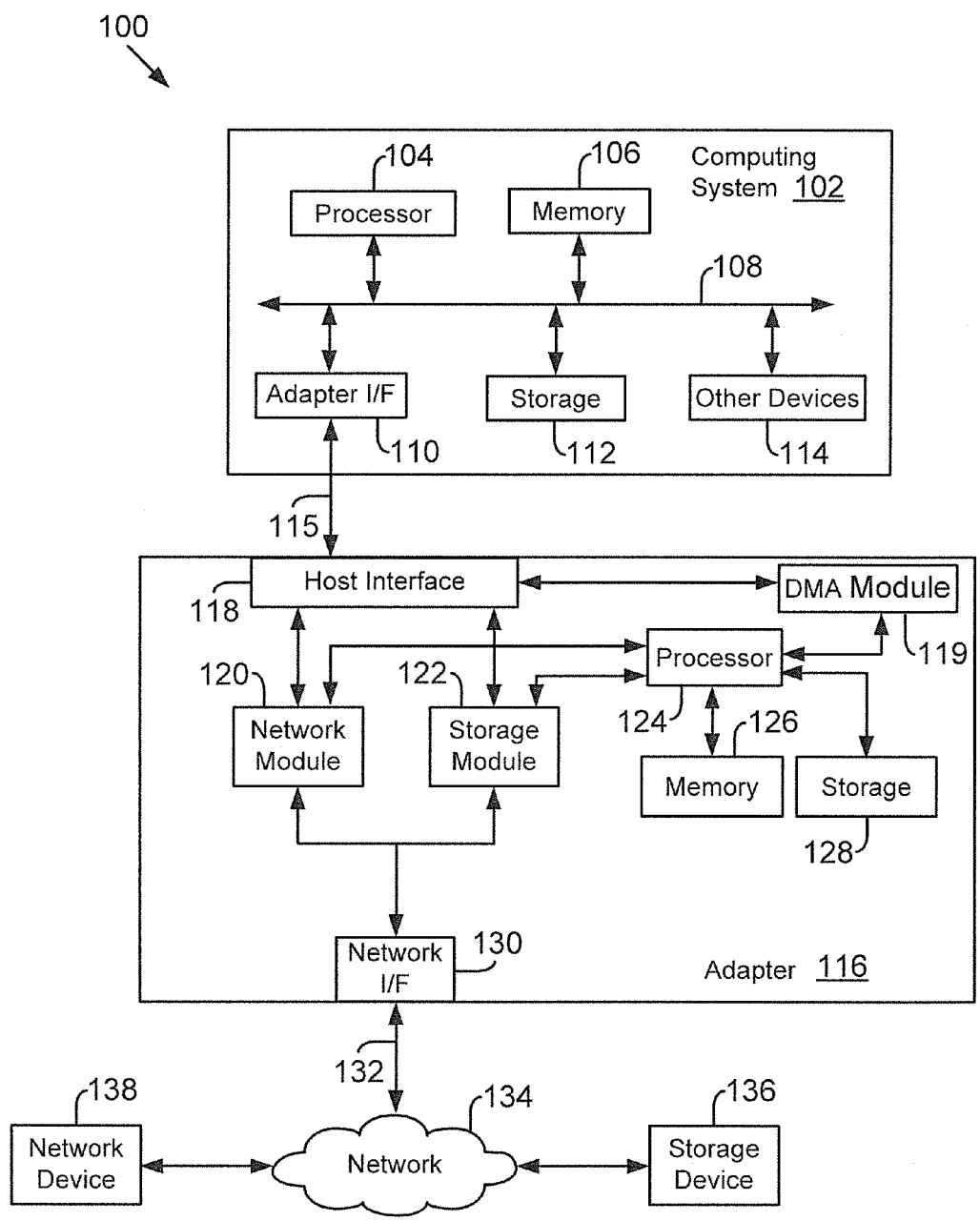
FIG. 1 is a functional block diagram of a computing system coupled to a network through an adapter.

The following detailed description describes the present embodiments with reference to the drawings. In the drawings, reference numbers label elements of the present embodiments. Theqn1468se reference numbers are reproduced below in connection with the discussion of the corresponding drawing features.

As a preliminary note, any of the embodiments described with reference to the figures may be implemented using software, firmware, hardware (e.g., fixed logic circuitry) or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

FIG. 1 is a block diagram of a system 100 configured for use with the present embodiments. The system 100 may include one or more computing system 102 (may also be referred to as "host system 102" or server 102) coupled to another device via a link 115, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or peripheral device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or a PCI-Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 interfaces with the adapter 116 via the link 115 for sending and receiving information. Link 115 may be an interconnect system, for example, a PCI-Express link. The computing system 102 also includes other devices and interfaces 114, which may include a display device interface, a keyboard interface, a pointing device interface, etc.

The computing system 102 may further include a storage device 112, which may be for example a hard disk, a CD-ROM, a non-volatile memory device (flash or memory stick) or any other mass storage device. Storage device 112 may store operating system program files, application program files, and other files. Some of these files are stored on storage device 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1, link 115 and the adapter interface 110 couple the adapter 116 to the computing system 102. The adapter 116 may be configured to handle both network and storage traffic. Various network and storage protocols may be used to handle network and storage traffic. Some of the common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates greater 100 Mbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed networks (for example, 10 Gigabit Ethernet networks) while preserving the Fibre Channel protocol. The adapter 116 shown in FIG. 1 may be configured to operate as an FCOE adapter and may be referred to as FCOE adapter 116. The illustrated adapter 116, however, does not limit the scope of the present embodiments. The present embodiments may be practiced with adapters having different configurations.

Referring back to FIG. 1, adapter 116 interfaces with the computing system 102 via the link 115 and a host interface 118. The adapter 116 may include a processor 124 that executes firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 122 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or ore ports (not shown). The network interface 130 includes logic and circuitry to receive information via the network link 132 and pass it to either the network module 120 or the storage module 122, depending on the packet type.

Adapter 116 also includes a direct memory access (DMA) module 119 that is used to manage access to link 115. The DMA module 119 uses a plurality of DMA channels for transferring data via link 115. The DMA channels are typically used to move control structures such as input/output control blocks (IOCBs), input/output status blocks (IOSBs) and data between host system memory 106 and the adapter memory 126.

Figure 2:
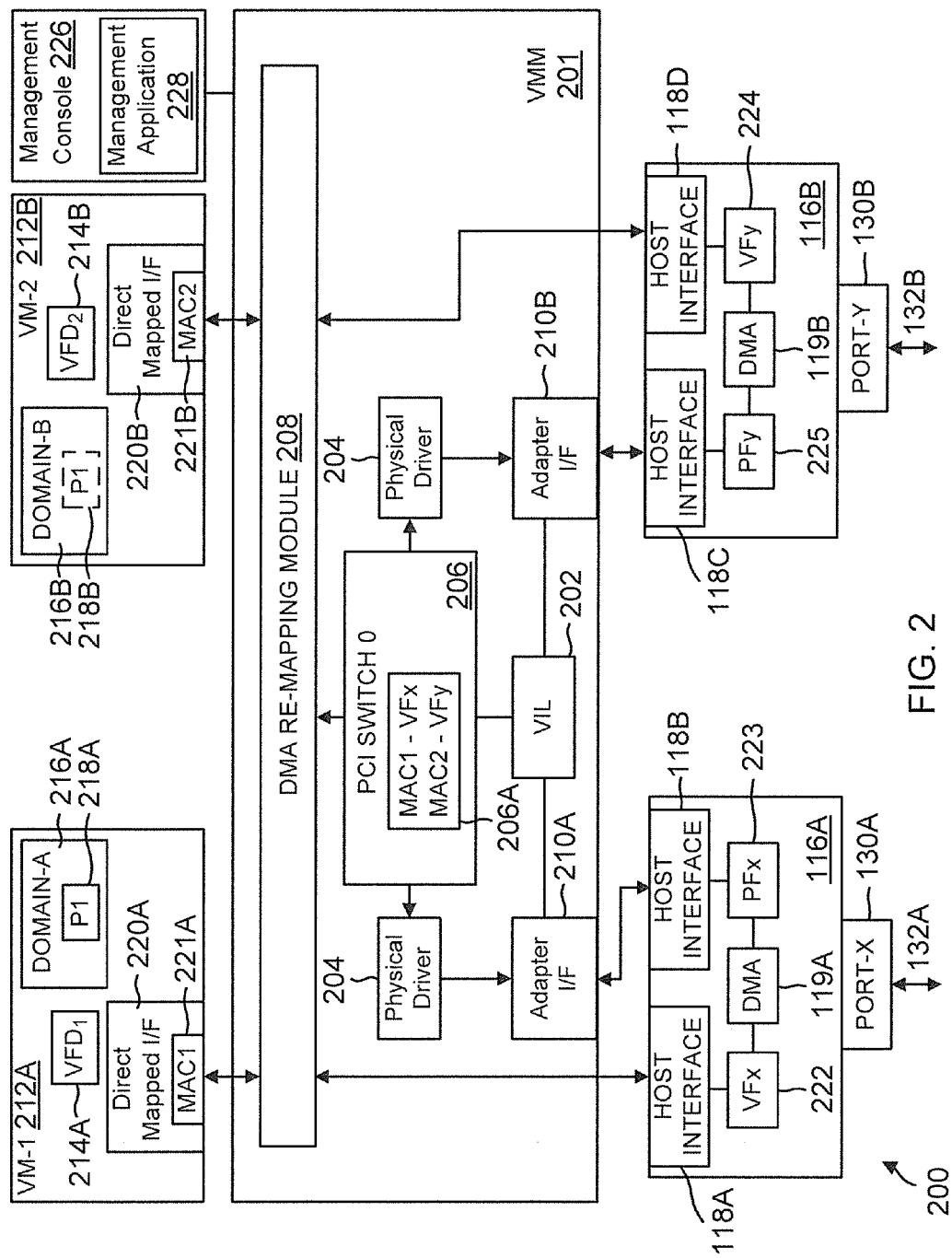
FIG. 2 shows a virtual environment using virtual machines, according to one embodiment.

FIG. 2 shows a block diagram of a virtual environment 200 according to an embodiment of the current disclosure. Virtual environment 200 supports single-root input/output virtualization (SR-IOV) as specified by the PCI Express specification that allows direct mapping of physical hardware resources/functions to virtual machines using virtual functions (may be referred to as VFs), as described below in detail.

Virtual environment 200 includes a virtual machine monitor (VMM) 201 for presenting a plurality of virtual machines (VMs) 212A/212B at one or more computing systems. An example of a VMM 201 is the Hypervisor layer provided by VMWare Corporation or the Hyper-V layer provided by Microsoft Corporation, (without derogation of any trademark rights owned by VMWare Corporation and/or Microsoft Corporation). It is noteworthy that different vendors may provide different virtual operating environments and the adaptive embodiments disclosed herein may be modified to accommodate the different virtual environments. In one embodiment, VMM 201 may be executed at a same computing device used for presenting the virtual machines or at a separate computing device.

VMs 212A and 212B are presented by VMM 201 at a computing system, similar to host system 102, described above in detail. VMs 212A and 212B may be presented at one more computing systems. In one embodiment, VMs 212A-212B may be used to present different operating system environments to clients, for example, Windows® based, Linux operating system, Solaris® and others. The operating systems may be referred to as guest OS.

In one embodiment, VMM 201 includes or executes a virtual interface layer (VIL) 202 that presents hardware based physical resources to VMs 212A-212B. Hardware resources include adapters (for example, 116), network interface cards, storage space, processors, memory and other devices. VIL 202 allocates resources for VMs 212A-212B and manages physical hardware resources. In another embodiment, as described below in detail, hardware resources may be directly mapped to a virtual machine, for example, via a DMA re-mapping module 208, based on the SR-IOV specification.

In one embodiment, VMM 201 executes a physical driver 204 that may be used by VIL 202 and other components for interfacing with adapters 116A/116B. VMM 201 may execute other device drivers depending on the shared physical resources. As an example, VMM 201 may be coupled to or communicate with one or more adapters 116A/116B (may be referred to as adapter 116) (or any other physical hardware resource) via adapter interface 210A and 210B (may be referred to as adapter interface 210) respectively as well as host interface 118B and 118C, respectively. Adapter interface 210A/210B and host interface 118B/118C may be a PCI-Express interface with logic and circuitry to send and receive PCI-Express packets via PCI express links. The embodiments described herein are not limited to a PCI-Express interface.

Adapter 116 may be used to facilitate input/output communications for reading and writing information at a storage device and/or for communicating with another device via port 130 and link 132. Adapter 116 may include one or more physical functions 223 and 225 (may be referred to as PFx 223 and PFy 225) that are shared among the various VMs as VFs 222 and 224, respectively. The physical functions may be any adapter hardware resource, for example, registers, logic, ports and other resources in an adapter.

Per the SR-IOV specification, the physical function 223 may be accessed by a VM directly via the DMA re-mapping module 208, instead of the VIL 202. The VMs use virtual function drivers (VFD1) 214A and VFD2 214B, respectively, to access the virtual functions. For example, PFx 223 may be accessible as VFx 222 via VFD1 214A, a direct mapped interface 220A and the DMA re-mapping module 208. The direct mapped interface 220A is assigned a media access control address (MAC1) 221A to access VFx 222 via a host interface 118A. The direct mapped interface 220A may operate as a virtual network interface card (VNIC), which is a directly mapped PCI interface compared to an emulated virtual NIC.

Similarly, for adapter 116B. PFy 225 is accessible as a virtual function VFy 224. VM2 212B executes a virtual function driver (VFD2) 214B that enables the use of VFy via direct mapped interface 220B using MAC2 221B and host interface 118D. Direct mapped interface 220B is similar to interface 220A described above.

In one embodiment, system 200 also includes a management console 226 executing a management application 228. The management console 226 may have a structure similar to host system 102. Management application 228 may be used to configure a PCI based, virtual switch 206 at VMM 201. Management application 228 may also be used to configure VMs 212A and 212B. The management application assigns MAC1 to VFx 222 and MAC2 to VFy 224. The MAC to PCI function mapping data structure 206A may be stored at a memory location for switch 206. The data structure 206A may also be provided to the DMA re-mapping module 208 that assists in DMA operations for directly mapped JO, as described below in detail. In one embodiment, DMA re-mapping module 208 may be an independent device.

A DMA operation, using DMA modules 119A/119B may be used to write data to and read data from a memory that is assigned to each VM. The physical memory may be segmented and is represented by logical domains, for example, Domain-A 216A for VM 212A and Domain-B 216B for VM 212B. A packet P1 218A from domain A 216A may be sent by VM 212A for VM2 212B. The logical memory domain addresses are assigned to VFs 222 and 224 and the mapping between the PCI functions and the domain addresses is provided to the DMA remapping module 208. The DMA remapping module 208 also maintains a data structure for translating logical memory domain address to physical memory addresses. The process for sending and receiving the packet is described below in detail.

Figure 3:
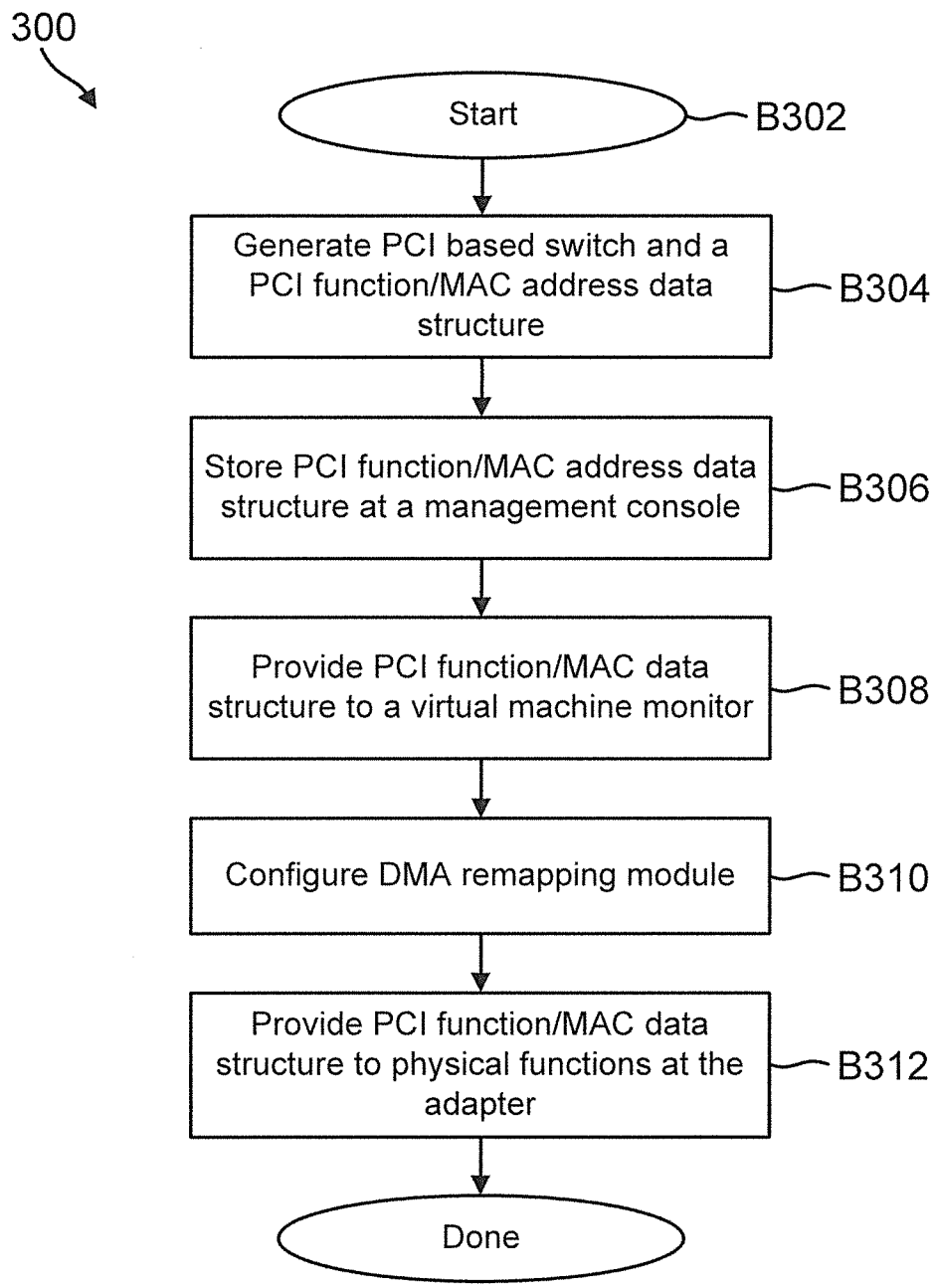
FIGS. 3-4 show various process flow diagrams, according to the various embodiments of the present disclosure.

FIG. 3 shows a process 300 for configuring the various elements of FIG. 2, according to one embodiment. The process begins in block B302, when VMM 201, VMs 212A/212B and management console 226 are initialized and operational. In block B304, the PCI-switch 206 is generated using management application 228. The PCI switch 206 is a virtual entity that can process packets. The switch is provided a unique identifier for identifying the switch.

In block B306, a mapping address data structure (206A) is generated. Data structure assigns the MAC addresses MAC1 and MAC 2 to VFx 222 and VFy 224, respectively. The MAC addresses are assigned to the VFs to access PFs 223 and 225, respectively. The data structure 206A may be stored at a storage location accessible to the management console 226. Thereafter, the data structure 206A is provided to VMM 201 in block B308.

Since VMM 201 manages the VMs, it is aware of the physical memory segments (or domains) for each VM to which data can be written to and read from, using a DMA operation. As mentioned above, this may be referred to as memory domain data structures. For example, Domain 216A is associated with VM 212A and Domain 216B is associated with VM 212B.

In one embodiment, in block B310, the DMA remapping module 208 is configured to support DMA operations for transferring data among VMs such that memory domains 216A/216B are accessible by both VFs 222/224. The memory domain data structure for the memory domains (216A/216B) and VFs 222 and 224 are provided to the DMA remapping module 208. The DMA remapping module 208 also maintains a data structure that maps the logical memory domain addresses to physical memory addresses. Thereafter in block B312, the physical driver 204 provides data-structure 206A to the respective PCI functions at adapters' 116A/116B. The process then ends.

Figure 4:
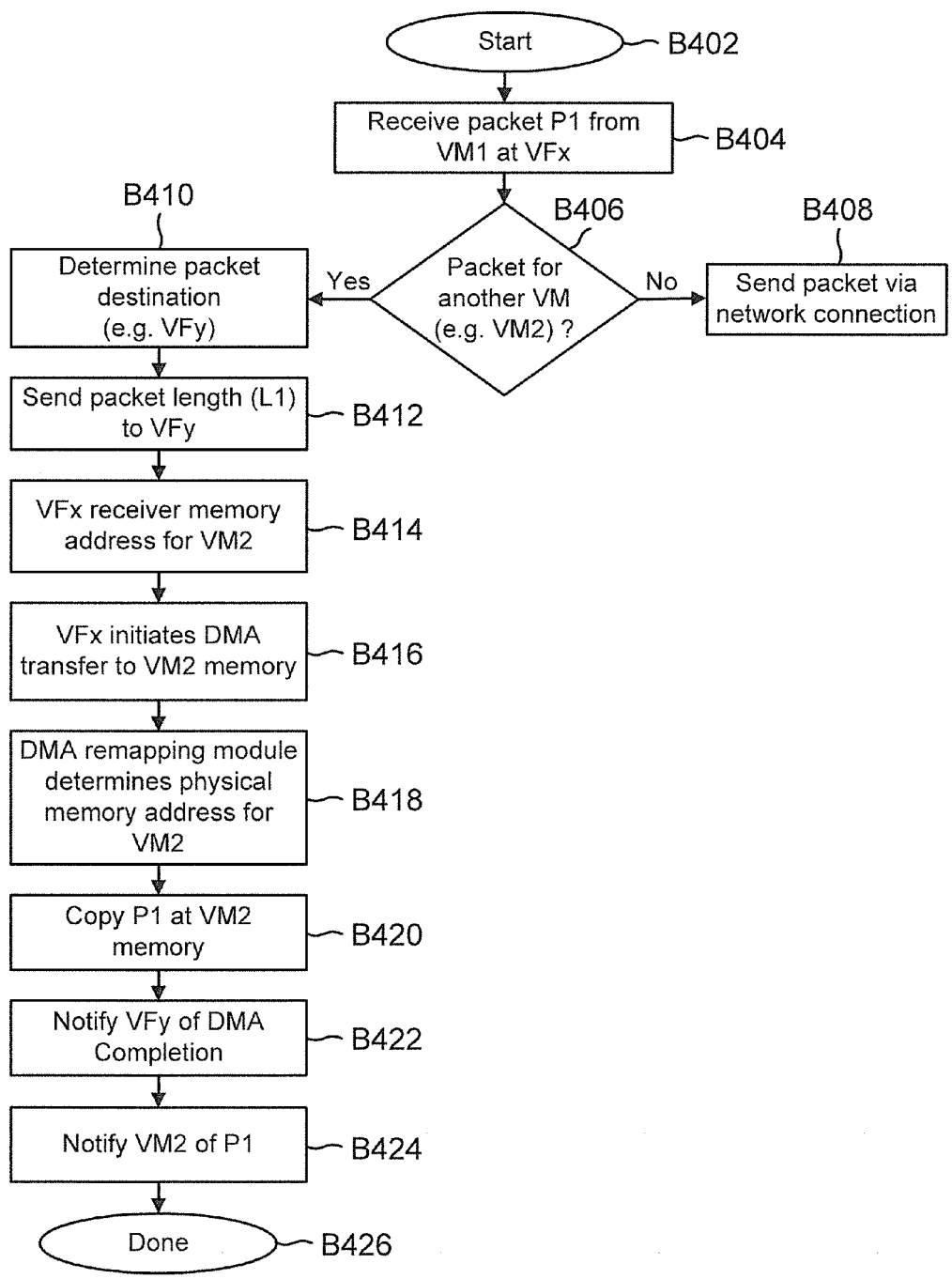

FIG. 4 shows a process for routing packet P1 218A from VM1 212A to VM2 212B, according to one embodiment. The process begins in block B402, when switch 206, mapping data structure 206A have been initialized. The packet P1 is ready to be sent via directly mapped interface 220A. The source MAC address is MAC1, while the destination MAC address is MAC2.

In block B404, the packet P1 218A is sent from the assigned memory domain A 216A to VFx 222 via a DMA operation. The DMA operation is initiated by VM1 212A with the assistance of DMA remapping module 208.

In block B406, VFx 222 determines if the packet is for another VM (e.g VM2 212B). This may be ascertained by determining if the destination MAC address of the packet P1 is present in data structure 206A of PCI based switch 206. If the packet is not destined for VM2 212B, then in block B408 the packet is routed via port 130A and link 132A to another network port/device and the process ends.

If the packet includes a MAC address, then in block B410, the MAC address (e.g. MAC2) is determined by VFx 222 using data structure 206A. When the data structure 206A includes a destination MAC address of the packet, then VFx 222 determines the destination function e.g. VFy 224.

In block B412, VFx 222 sends the packet length (L1) for P1 218A to VFy 224. Since VFy knows the logical memory domain for VM2, it provides the logical memory address to VFx 222 in block B414. This may be executed using inter function communication protocol, for example, as Transaction Layer Packets (TLPs). A DMA operation is then initiated in block B416, by VFx 222. The DMA remapping module 208 traps the DMA commands and translates the logical memory address to a physical memory address in block B418. The DMA remapping module 208 maintains a data structure that maps logical and physical memory addresses. The packet is then copied to the physical memory in block B420. VFx 222 is notified after the packet is copied.

In block B422, VFx 222 notifies VFy 224 that the packet has been transferred. In block B424, VM2 212B is notified of packet P1 by VFy 224. The process then ends in block B426.

The system and processes described above have various advantages compared to conventional systems, where either a virtual switch executed by VMM 201, an embedded switch at a NIC or a physical switch (not shown) is used to route packets. The conventional approaches have disadvantages. For example, a Vswitch by VMM 201 consumes processor cycles and resources. Embedded adapter switches only route traffic to VMs that are associated with an adapter. Furthermore, the system described above can route the packets between two different adapters.

In one embodiment, an external hardware switch is not used to send packets between VMs. This reduces latency. The process also avoids large segment offload operations because VFx uses the DMA operation without using an external network. Hence, segment length of the traffic is not limited by external network.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method, comprising:
   assigning a first network address to a first virtual function of a first device used by a first virtual machine to send and receive data;
   assigning a second network address to a second virtual function of a second device used by a second virtual machine to send and receive data;
   providing a mapping data structure to a direct memory access (DMA) remapping module and to the first and second virtual functions;
   sending a packet to the first virtual function from a first memory domain associated with the first virtual machine via a first DMA operation, wherein a source address in the packet is the first network address and a destination address in the packet is the second network address;
   determining by the first virtual function that the packet is destined to the second virtual function of the second virtual machine by comparing the destination address to the mapping data structure provided to the first virtual function;
   sending a packet length by the first virtual function to the second virtual function;
   the first virtual function initiating a second DMA operation to transfer the packet to the second virtual machine based on a logical memory address of the second virtual machine that is received from the second virtual function;
   trapping the second DMA operation by the DMA remapping module;
   translating the logical memory address to a physical memory address by the DMA remapping module;
   using the second DMA operation to transfer the packet directly to a second memory domain associated with the second virtual machine;
   the first virtual function notifying the second virtual function that the packet has been transferred; and
   the second virtual function notifying the second virtual machine of the packet in the second memory domain.

2. The method of claim 1, wherein if the packet is not destined to the second virtual machine, then the packet is transmitted to another device via the first device.

3. The method of claim 1, wherein the DMA remapping module uses a data structure to determine the physical memory address corresponding to the logical memory address of the second virtual machine.

4. The method of claim 1, wherein the mapping data structure is configured using a management console and is provided to the first device associated with the first virtual machine.

5. The method of claim 1, wherein the first device is an adapter that is used for sending and receiving information.

6. The method of claim 1, wherein the mapping data structure stores an identifier for the first virtual function and a corresponding media access control (MAC) address as the first network address.

7. The method of claim 1, wherein the mapping data structure is provided to the DMA remapping module that assists in transferring the packet between the first virtual machine and the second virtual machine.

8. A non-transitory, machine readable storage medium storing executable instructions executed by a machine to perform a method, the method comprising:
   assigning a first network address to a first virtual function of a first device used by a first virtual machine to send and receive data;
   assigning a second network address to a second virtual function of a second device used by a second virtual machine to send and receive data;
   providing a mapping data structure to a direct memory access (DMA) remapping module and to the first and second virtual functions;
   sending a packet to the first virtual function from a first memory domain associated with the first virtual machine via a first DMA operation, wherein a source address in the packet is the first network address and a destination address in the packet is the second network address;
   determining by the first virtual function that the packet is destined to the second virtual function of the second virtual machine by comparing the destination address to the mapping data structure provided to the first virtual function;
   sending a packet length by the first virtual function to the second virtual function;
   the first virtual function initiating a second DMA operation to transfer the packet to the second virtual machine based on a logical memory address of the second virtual machine that is received from the second virtual function;

trapping the second DMA operation by the DMA remapping module;
translating the logical memory address to a physical memory address by the DMA remapping module;
using the second DMA operation to transfer the packet directly to a second memory domain associated with the second virtual machine;
the first virtual function notifying the second virtual function that the packet has been transferred; and
the second virtual function notifying the second virtual machine of the packet in the second memory domain.

9. The storage medium of claim 8, wherein if the packet is not destined to the second virtual machine, then the packet is transmitted to another device via the first device.

10. The storage medium of claim 8, wherein the DMA remapping module uses a data structure to determine the physical memory address corresponding to the logical memory address of the second virtual machine.

11. The storage medium of claim 8, wherein the mapping data structure is configured using a management console and is provided to the first device associated with the first virtual machine.

12. The storage medium of claim 8, wherein the first device is an adapter that is used for sending and receiving information.

13. The storage medium of claim 8, wherein the mapping data structure stores an identifier for the first virtual function and a corresponding media access control (MAC) address as the first network address.

14. The storage medium of claim 8, wherein the mapping data structure is provided to the DMA remapping module that assists in transferring the packet between the first virtual machine and the second virtual machine.

15. A system comprising:
a processor executing instructions out of a memory for:
assigning a first network address to a first virtual function of a first device used by a first virtual machine to send and receive data;
assigning a second network address to a second virtual function of a second device used by a second virtual machine to send and receive data;
providing a mapping data structure to a direct memory access (DMA) remapping module and to the first and second virtual functions;
sending a packet to the first virtual function from a first memory domain associated with the first virtual machine via a first DMA operation, wherein a source address in the packet is the first network address and a destination address in the packet is the second network address;
determining by the first virtual function that the packet is destined to the second virtual function of the second virtual machine by comparing the destination address to the mapping data structure provided to the first virtual function;
sending a packet length by the first virtual function to the second virtual function;
the first virtual function initiating a second DMA operation to transfer the packet to the second virtual machine based on a logical memory address of the second virtual machine that is received from the second virtual function;
trapping the second DMA operation by the DMA remapping module;
translating the logical memory address to a physical memory address by the DMA remapping module;
using the second DMA operation to transfer the packet directly to a second memory domain associated with the second virtual machine;
the first virtual function notifying the second virtual function that the packet has been transferred; and
the second virtual function notifying the second virtual machine of the packet in the second memory domain.

16. The system of claim 15, wherein if the packet is not destined to the second virtual machine, then the packet is transmitted to another device via the first device.

17. The system of claim 15, wherein the DMA remapping module uses a data structure to determine the physical memory address corresponding to the logical memory address of the second virtual machine.

18. The system of claim 15, wherein the mapping data structure is configured using a management console and is provided to the first device associated with the first virtual machine.

19. The system of claim 15, wherein the mapping data structure stores an identifier for the first virtual function and a corresponding media access control (MAC) address as the first network address.

20. The system of claim 15, wherein the mapping data structure is provided to the DMA remapping module that assists in transferring the packet between the first virtual machine and the second virtual machine.

* * * * *